United States Patent [19]
Clement et al.

[11] Patent Number: 5,561,958
[45] Date of Patent: Oct. 8, 1996

[54] DYNAMIC-INSULATION WALL ELEMENT FOR RENEWING AIR IN BUILDINGS IN ORDER TO MAKE THEM MORE COMFORTABLE AND CHEAPER

[75] Inventors: Pierre Clement, 95, rue de la Santé ; Bruno Clement, 71, avenue de Choisy, both of 75013 Paris; Christelle Clement, 8, rue Dancourt, 75018 Paris; Martine Clement; Sabine Clement, both of 95, rue de la Santé , 75013 Paris, all of France

[73] Assignees: Neurones of Zone Industrielle, Le Guillaume; Pierre Clement, Paris; Bruno Clement, Paris; Christelle Clement, Paris; Martine Clement, Paris; Sabine Clement, Paris, all of France

[21] Appl. No.: 417,148

[22] Filed: Apr. 3, 1995

[51] Int. Cl.⁶ ...................................................... E04B 1/74
[52] U.S. Cl. ...................... 52/407.1; 52/220.1; 52/302.3; 52/309.14; 454/250; 428/119; 428/120
[58] Field of Search ................................ 52/407.1, 309.9, 52/794.1, 220.1, 783.1, 302.3, 309.14; 454/250, 364, 365, 366; 428/156.292, 119, 120

[56] References Cited

U.S. PATENT DOCUMENTS

| | | | |
|---|---|---|---|
| 2,330,941 | 10/1943 | Acuff, Jr. | 52/407.1 X |
| 2,541,762 | 2/1951 | Heritage | 52/407.1 |
| 3,121,262 | 2/1964 | Loncoske | 52/407.1 X |
| 3,595,728 | 7/1971 | Robson | 52/407.1 X |
| 4,850,166 | 7/1989 | Taylor | 52/302.3 X |
| 5,353,564 | 10/1994 | Hansen | 52/407.1 |

FOREIGN PATENT DOCUMENTS

| | | |
|---|---|---|
| 2264934 | 10/1975 | France . |
| 2473161 | 7/1981 | France . |
| 2549877 | 2/1985 | France . |
| 2584976 | 1/1987 | France . |
| 2597903 | 10/1987 | France . |
| 2675182 | 10/1992 | France . |
| 3441597 | 4/1986 | Germany . |
| 4042208 | 2/1992 | Germany . |

Primary Examiner—Carl D. Friedman
Assistant Examiner—David J. Jersen
Attorney, Agent, or Firm—Sughrue, Mion, Zinn, Macpeak & Seas

[57] ABSTRACT

A dynamic insulation wall element for use in a building to improve in natural manner the comfort of the building with respect to temperature, sound level, air flow, and humidity, the element being constituted by a composite plate having at least one layer made of a thermally insulating material that is provided with spacers on at least one of its faces, the spacers defining an air passage in at least two directions parallel to the plate for causing air to enter and flow within the building, wherein the composite plate further includes a layer that is strong and hydrophilic and that is disposed against the spacers of the layer of thermally insulating material.

18 Claims, 3 Drawing Sheets

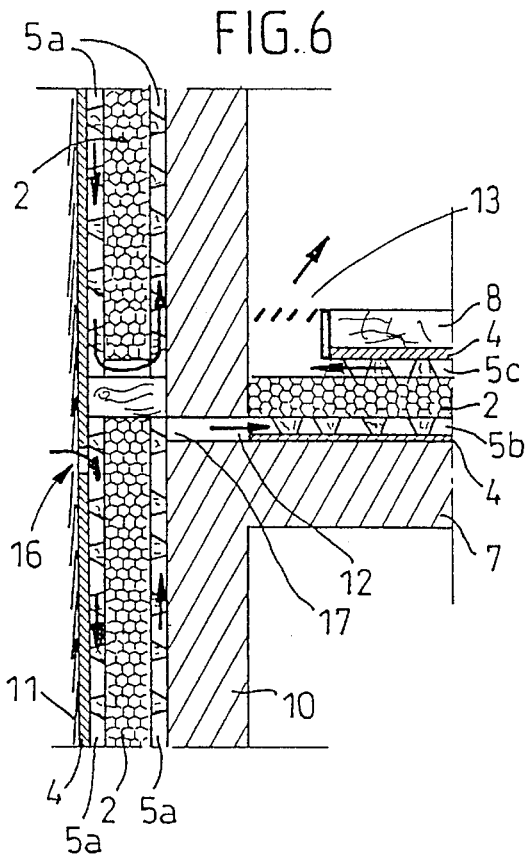
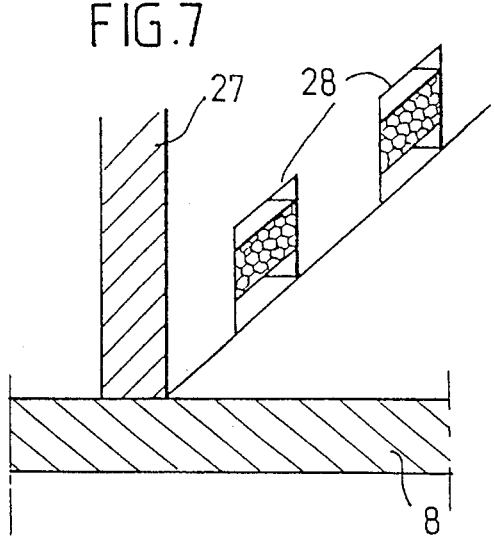
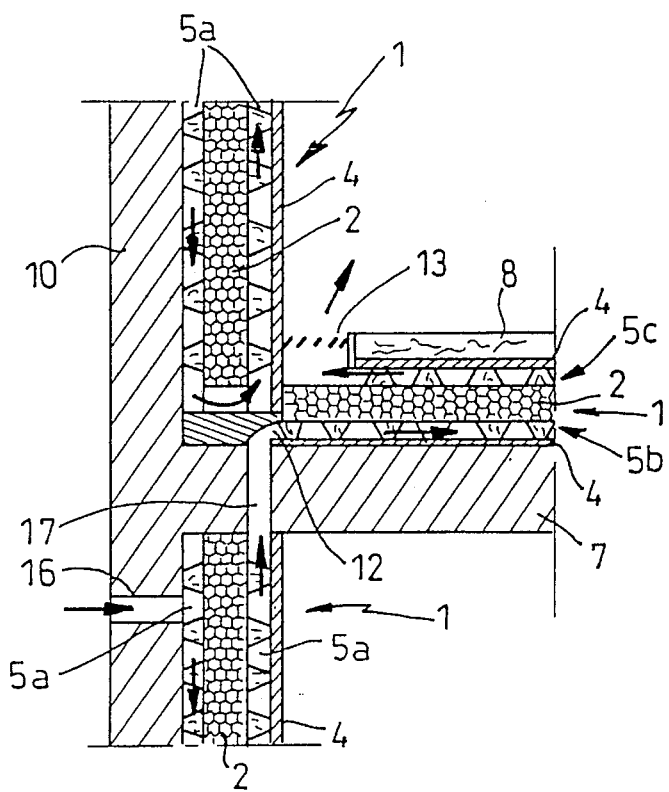
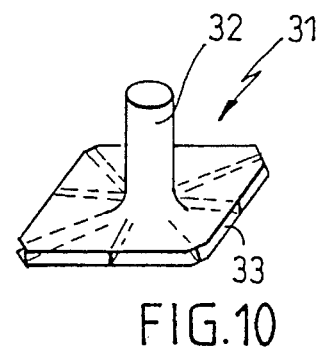
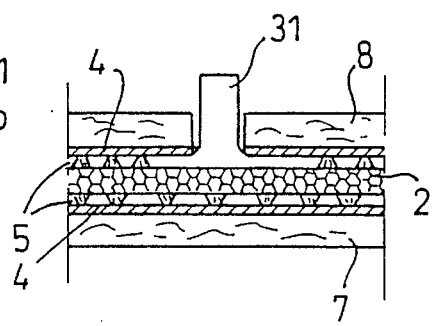

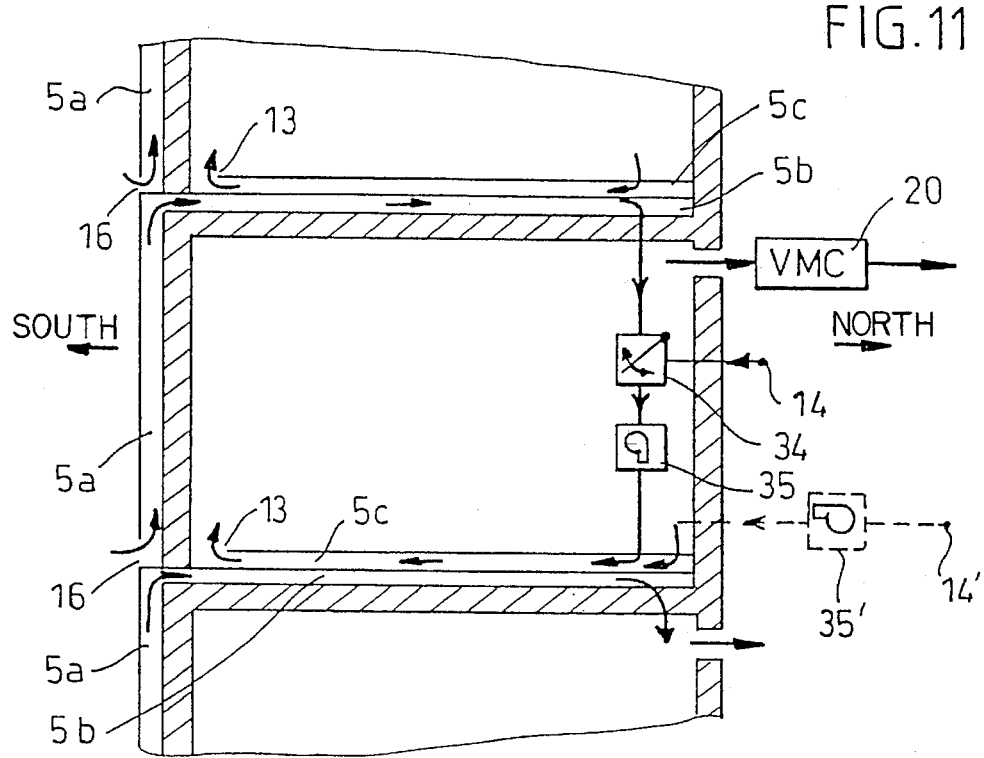
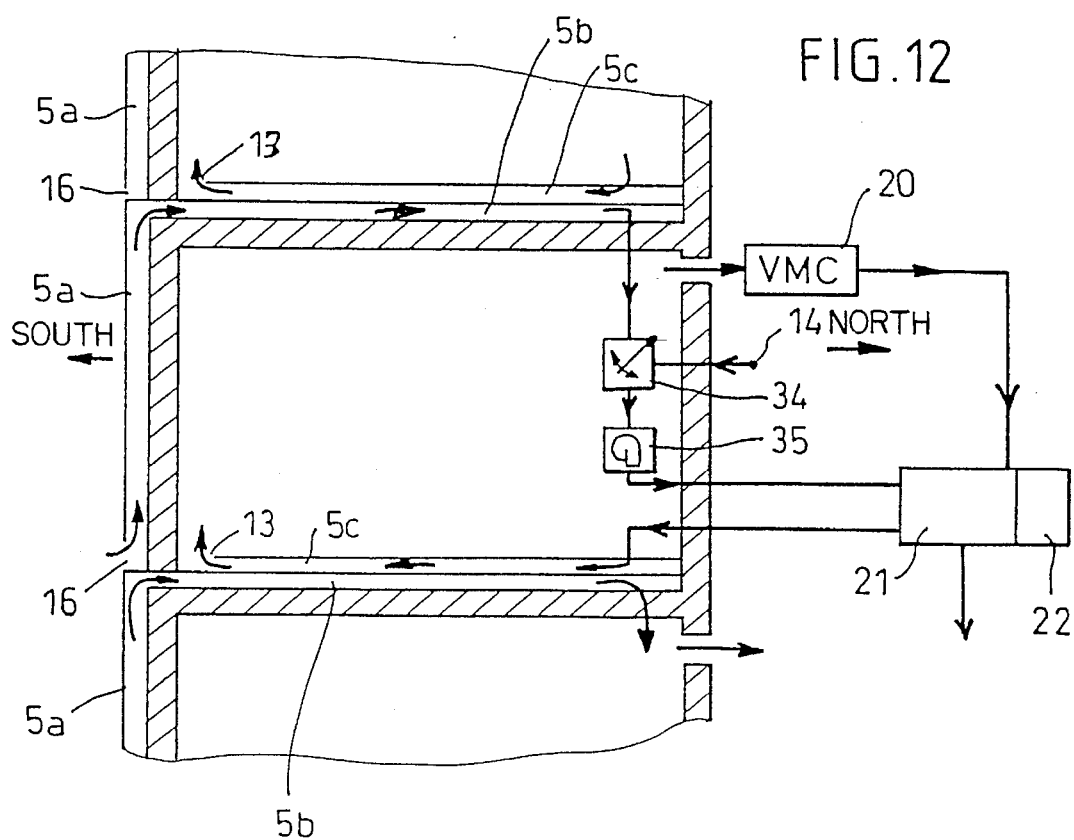

DYNAMIC-INSULATION WALL ELEMENT FOR RENEWING AIR IN BUILDINGS IN ORDER TO MAKE THEM MORE COMFORTABLE AND CHEAPER

The present invention relates to a dynamic insulation wall element for renewing air in buildings in order to make them more comfortable and cheaper.

BACKGROUND OF THE INVENTION

The present inventor has already invented an insulating wall element in the form of a plate for covering a floor or a ceiling, as disclosed in Document FR-A-2 637 887. That wall element comprises a layer of insulating material having projections on one face and a layer of covering material that covers the layer of insulating material. The projections leave passages in which it is possible to establish a flow of fluid for the purposes of heating, cooling, drying, or humidifying the premises, or else to lay pipework for gas, water, electricity, etc. That wall element provides an insulating effect not only thermally, but also acoustically.

OBJECTS AND SUMMARY OF THE INVENTION

The present invention preferably provides for two sheets of air flow, one on each side of the insulating layer. Such an implementation makes it possible to extract maximum benefit from the thermal inertia of the floor or of the ceiling, thereby attenuating sudden temperature changes in the outside air, and thus improving the thermal comfort of the building. This temperature-regulating effect can reduce energy requirements considerably by storing solar energy, and can also regulate energy additions, e.g. by restoring by day coolness that has been stored overnight. In addition, this effect prevents any condensation, thereby ensuring that a wall is always dry.

However, when the empty passages between the projections on the insulating layer are used to convey new air for renewing the air within dwellings or professional premises, the prior art wall elements nevertheless suffer from the drawback of the air inside the premises being much too dry whenever heating is taking place simultaneously. This drawback is not specific to those particular wall elements, but is to be found in all modern air-renewal systems. The conventional solution to the problem is to use air humidifier appliances, but that is expensive.

According to the invention, this problem is solved by a wall element for use in a building, the wall element being constituted by a composite plate having at least one layer of material that is thermally insulating and that is provided with spacers on at least one of its faces, the spacers defining an air passage in at least two directions parallel to the plate in order to cause air to penetrate into the building, wherein the composite plate further includes at least one layer of material that is strong and hydrophilic and that is disposed against the spacers of the layer of thermally insulating material.

The hydrophilic material constitutes an excellent store of humidity, which store refills during periods when the incoming air is humid (e.g. when it is raining or foggy outside), and thereafter it restores the humidity when the incoming air is dry. The layer of material that is strong and hydrophilic also contributes to the strength of the wall element as a whole, and it protects the projections on the layer of insulating material. In addition, the layer of material that is strong and hydrophilic makes it easy to secure various items to the wall element (cables or pipes when the wall element is used on a floor; facings, covering, stone slabs, or possibly cables and pipes when the wall element is used vertically on the outside or on the inside, etc.), e.g. using nails, screws, adhesive, etc.

Naturally, the wall element of the invention conserves the temperature and sound insulation characteristics already known from Document FR-A-2 367 887. In addition, the layer of material that is strong and hydrophilic increases the thermal inertia of the composite plate, thereby making it possible to attenuate variations in the temperature of the outside air.

Although fixing by means of nails or the like is quite possible without imposing any special conditions on the layer of material that is strong and hydrophilic, if said layer is solid, then nailing gives rise to a small amount of time being wasted while the wall is being made, and if nailing is not performed carefully, then it can give rise to local damage in the layer of material that is strong and hydrophilic. To remedy those drawbacks, the layer of material that is strong and hydrophilic may be pierced by holes that are all identical. It is thus possible to fix various items on the layer of material that is strong and hydrophilic by means of wall plugs, which are easier and quicker to insert than are nails. The holes may be through holes, or they may be blind holes in that face of the layer of material that is strong and hydrophilic which faces away from the layer of thermally insulating material, thereby preventing debris from penetrating into the air passage of the plate.

In order to improve sound insulation, the composite plate may optionally include a layer of resilient sound insulation material. This layer may be an additional layer or it may optionally be included in or constituted by the above-mentioned layer of thermal insulation.

The invention also provides a building floor including a substantially horizontal supporting wall, wall elements as defined above placed on the supporting wall, with their layer of material that is strong and hydrophilic, or with one of their layers of material that is strong and hydrophilic, facing upwards, the air passages in the various wall elements intercommunicating horizontally and being connected to an inlet for air coming from the outside and to an outlet for air going to the inside of the building, heater means being disposed on the layer of material that is strong and hydrophilic that faces upwards, the heater means being covered in a layer of facing. The air flowing along the air passage defined by the projections on the insulating layer is thus heated by the floor heating prior to penetrating into the rooms of the building, thereby improving temperature comfort and limiting heat losses. In one embodiment, the layer of facing is a concrete or self-smoothing coating formed over the layer of material that is strong and hydrophilic, with a waterproof film being disposed between the coating and the layer of material that is strong and hydrophilic in order to avoid any contact between the layer of material that is strong and hydrophilic and the coating, and the heater means are embedded in the coating. In another embodiment, the layer of facing is a dry coating, with the heater means being embedded in a bed of sand, and with the dry coating being placed on the bed of sand.

The invention also provides a building facade comprising a substantially vertical support wall, wall elements as defined above fixed to the support wall so that their layer of material that is strong and hydrophilic, or one of their layers of material that is strong and hydrophilic, is directed towards the outside of the building, and a layer of facing to insulate the layer of material that is strong and hydrophilic from bad weather, the air passages of the various wall elements being connected to an air inlet that communicates with the outside atmosphere and to an air outlet leading to the inside of the building. Advantageously, said support wall is disposed so as to be exposed to the sun during at least a part of the day. The air flowing along the air passages in the composite plates can thus be heated in winter by the outside facing being heated under the effect of solar radiation. Optionally, in summer, the air penetrating into the building may be taken, at least at some times and/or to some extent from the north face of the building, thereby making it possible to obtain air that is cooler.

The invention also provides a system of renewing the air in a building that includes a floor and a ceiling each provided with wall elements as defined above, in which the ceiling wall elements include air passages which intercommunicate horizontally and which are connected to an air inlet which communicate with the outside of the building, the floor wall elements including air passages which intercommunicate horizontally and which communicate firstly with the air passages of the ceiling wall elements, and secondly with an air outlet leading to the inside to the building. Thus, in winter, incoming air is also heated in the ceiling before penetrating into the room, thereby further contributing to reducing the temperature difference between the floor and the ceiling. Means may also be provided for preventing the incoming air from passing through the ceiling in summer, and possibly also for causing incoming air in summer to come at least in part and/or during part of the day from an auxiliary air inlet that communicates directly with the atmosphere, preferably to the north.

In another embodiment, the air renewal system of the invention further includes a heat pump for extracting heat from the air leaving the building, the heat pump receiving the air that penetrates into the building via the air passages of the wall elements, the air renewal system further including means for selectively using the heat pump either to heat the air entering the building, or to cool the air entering the building, or else to take no action on the air entering the building.

Advantageously, the heat pump is also used for heating the water in a hot water tank in a hot water circuit.

The invention also provides a system for renewing the air in a building that includes at least a floor and a ceiling presenting wall elements as defined above, and further including a blower for injecting air taken from outside the building into the air passages. Optionally, the blower is coupled to means for processing the air, e.g. to disinfect or deodorize the air, to remove insects, etc. The blower can thus inject air at the temperature of the ambient atmosphere, at least during certain periods and during at least a portion of the day.

BRIEF DESCRIPTION OF THE DRAWINGS

Other characteristics and advantages of the invention appear from the following detailed description of various embodiments of the invention, given by way of non-limiting example and made with reference to the accompanying drawings.

In the drawings:

FIG. 5 shows one way of implementing the FIG. 1 wall element both on a floor and on the inside of the wall of a building;

FIG. 6 shows one way of implementing the FIG. 1 wall element both on a floor and on the outside of the wall of a building;

FIG. 7 shows one possible way of passing air through a load-carrying wall of a building so as to establish a flow of air in the wall elements of the invention disposed on the floor;

FIG. 8 shows a detail of FIG. 7;

FIG. 9 shows one possible embodiment for the air outlet associated with FIG. 1 wall elements disposed on a floor;

FIG. 10 shows a detail of FIG. 9;

FIG. 11 shows a first method of operating the air renewal system of the invention; and FIG. 12 shows a second method of operating an air renewal system of the invention.

MORE DETAILED DESCRIPTION

Figure 1:
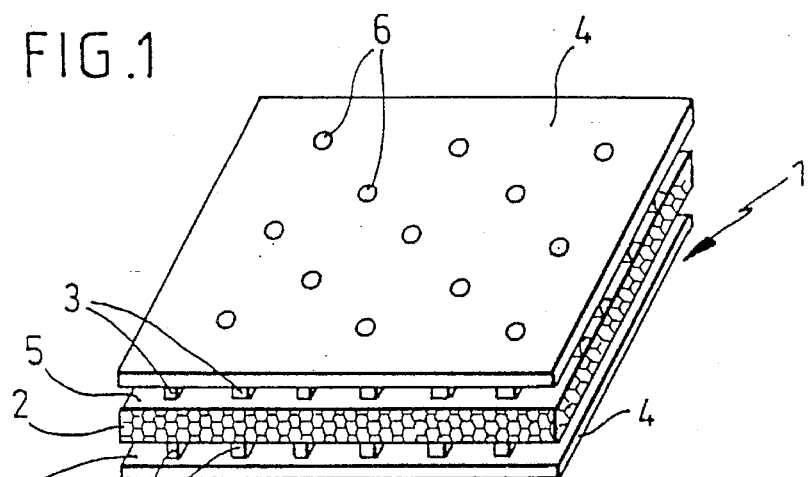
FIG. 1 is a perspective view of an insulating wall element of the invention.
Figure 2:
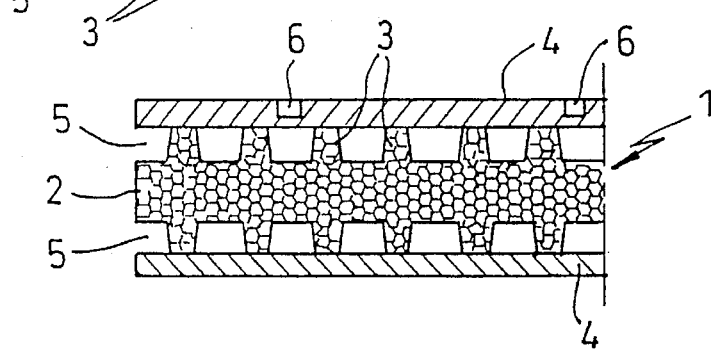
FIG. 2 is a fragmentary cross-section through the FIG. 1 wall element.

FIGS. 1 and 2 show an insulating wall element of the invention. The wall element is constituted by a composite plate 1 made up of a central layer 2 itself made of a material that is thermally insulating, and disposed between two layers of plaster-type hydrophilic material 4. A series of spacers 3 may be placed on one of the two faces of the central layer 2, thereby defining an air passage 5 in which air can flow in at least two directions parallel to the composite plate 1. The spacers 3 preferably project from the central plate 2 and are integrally formed with the central plate 2. The plaster plate(s) are preferably stuck to the projections 3, but they may be fixed to them by any other means. In a particular embodiment, the central layer 2 is about 40 mm thick, and each of the air passages is about 20 mm thick. Advantageously, at least one of the plaster layers 4 includes holes 6 that are open to the outside of the composite plate 1 for a purpose that is explained below. Advantageously, as can be seen in FIG. 2, the holes 6 are blind holes so that they do not communicate with the air passages 5, thereby preventing impurities from penetrating into the air passages 5. The projections 3 may be of any shape, although preferred shapes are projections that are squares or rectangles disposed in alignment with one another. The composite plate 1 is preferably prefabricated in a factory, to standard dimensions. It may be observed that the composite plate 1 could optionally comprise a single plaster plate 4, and optionally the insulating central layer 2 could include projections 3 only facing the plaster plate.

Figure 3:
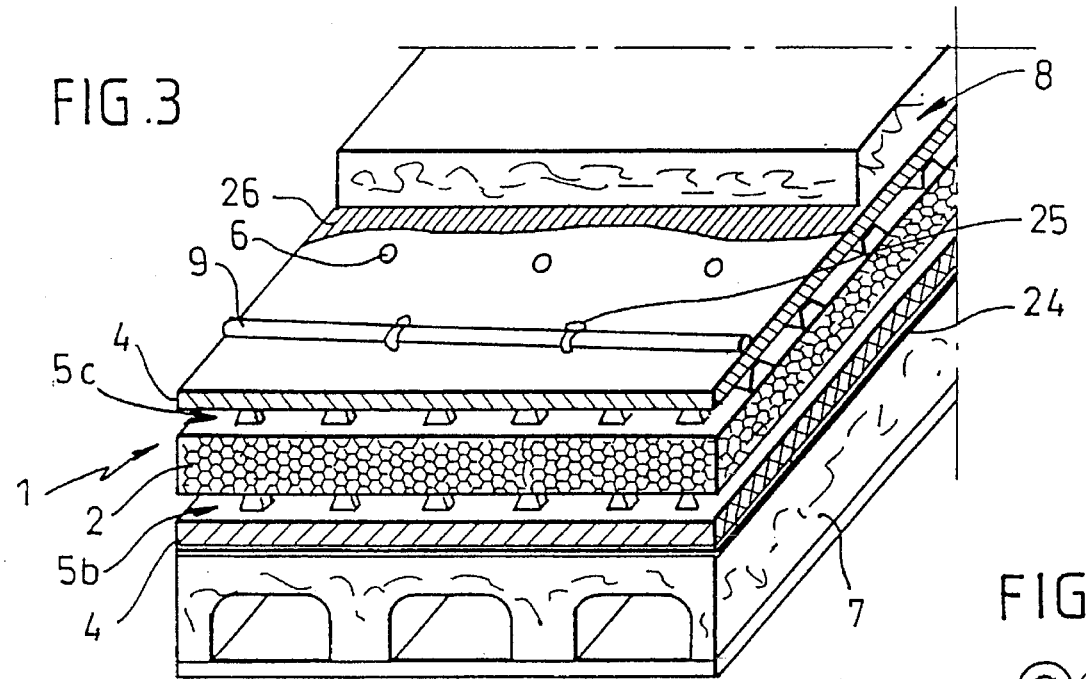
FIG. 3 is a cutaway view showing how the FIG. 1 wall element is implemented on a floor.

FIG. 3 shows an embodiment of the wall element of FIGS. 1 and 2 on a floor. The floor comprises a horizontal slab 7 or any other supporting wall. The top surface of the slab 7 is preferably smooth. If the top surface of the slab 7 is not smooth, it may be milled, or it is possible to lay a bed of smooth sand 24 on top of the slab 7. Optionally, a layer of resilient sound insulation material may also be disposed on the slab 7. It is also possible to incorporate resilient sound insulation material in the composite plate 1, and it will also be observed that even if an additional layer of resilient sound insulation material is not incorporated therein, a composite plate as shown in FIGS. 1 and 2 is capable of providing good sound insulation, particularly because of the projections 3 which are poor at transmitting impact noise, and which also establish sound traps. In addition, the central layer 2 of the composite plate 1 may also have a degree of elasticity that attenuates impact noise.

Figure 4:
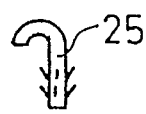
FIG. 4 is a view showing a detail of FIG. 3.

The composite plates 1 are laid in juxtaposition on the slab 7, and then, if necessary, pipes, electrical cable ducts, or heater cables 9 are laid on the composite plates 1. Advantageously, the ducts or cables are fixed to the composite plate 1, optionally by nails or the like engaged in the top layer of plaster 4, and preferably by inserting hook-shaped plugs 25 (see FIG. 4) in the above-described blind holes. A waterproof film 26, e.g. a polyane film is placed over the composite plates 1 and any ducts or cables 9, after which a concrete coating 8 or some other coating is cast onto the film 26 (e.g. a dry coating, in which case the cables and ducts are preferably embedded in a bed of sand between the dry coating and the composite plates).

As described above, the air passages 5 of the various composite plates 1 intercommunicate horizontally to form two horizontal air passages 5b and 5c. The horizontal air passages 5b and/or 5c are in communication firstly with an air inlet (not shown) providing air taken from outside the building, and secondly with an air outlet leading to the inside of the rooms in the building. As already described, the plaster layers 4 serve to regulate the humidity of the air. In addition, the flow of air makes it possible to recover a large fraction of the heat that is transmitted by the heater cable 9 to the upper plaster plate 4, thereby giving rise to significant energy saving and improvement in comfort. Furthermore, the considerable thermal inertia of the slab 7, and possibly also the thermal inertia of the composite plate 1, is used to attenuate sudden changes in the temperature of the outside air. Thus, in summer, it is possible to achieve a certain amount of cooling of the air that penetrates into the building. Optionally, it is possible to fit cooling ducts onto the upper plaster layer 4, in addition to the heater cables 9.

As shown in FIG. 5, the wall elements of the invention can also be disposed vertically on the insides of the facade walls of a building. In the example shown, the composite plates 1 comprise one layer only of plaster that faces towards the inside of the building, but it would also be possible for the composite plates 1 to have two layers of plaster 4. Air penetrating into the building flows along the air passages 5a of the vertical composite plates 1. When the facade wall 10 is exposed to the sun, this achieves a certain amount of heating because of the solar energy picked up by the wall 10, in addition to the thermal inertia effect of the wall 10. In the example shown in FIG. 5, the wall 10 has openings 16 in communication with the atmosphere, and the air passages 5a of the vertical composite plate communicate firstly with the air inlet openings 16 and secondly with air outlets 17 leading to the inside of the building. The air outlets 17 of the air passages 5a of the vertical composite plates also communicate with air inlets 12 for the lower air passages 5b of the horizontal composite plates 1 above the ceiling slab of the story concerned. The ceiling air passages 5b communicate with the upper air passages 5c of the composite plates 1 disposed on the floor slab of the store concerned, and the air passages 5c communicate with floor grids 13 that allow air to enter the rooms. The air passages penetrating into the ceilings of the rooms enable a fraction of the heat in the air situated in the top portions of the rooms to be recovered, which portion is the hottest air in the rooms, thereby helping to minimize the vertical temperature gradient within the rooms, thus improving thermal comfort.

As shown in FIG. 6, the composite plates 1 may optionally be disposed on the outside of a facade wall 10 of a building, with the plaster layer 4 on the outside of the building being covered in facing 11 (slates, stone slabs, or any other covering), thereby protecting the plaster 4 from bad weather. In this particular example, the layer of plaster 4 could optionally be replaced by a layer of material that is strong but not hydrophilic. The facing 11 can easily be fixed to the outside layer of plaster 4, e.g. by nails or by inserting plugs in the holes 6 in the plaster layer, as described above. In this example, the air inlet opening 16 is formed through the outside plaster layer 4.

In the examples of FIGS. 5 and 6, the composite plates 1 may be applied to the wall 10 after it has been built, or else, if the wall 10 is made of concrete, then the composite plates 1 can be put into place within sheeting while the concrete is being cast, thereby securing them to the wall 10.

When composite plates 1 of the invention are used on a floor, it is possible to cause the air passages 5 in the plates 1 disposed on opposite sides of a load-bearing wall 27 to communicate with one another, as shown in FIGS. 7 and 8, by means of gaps 28 left through the load-bearing wall 27, which gaps are preferably internally lined as shown at 29 with a horizontal insulating layer 30 of thickness and position corresponding respectively to the thickness and the position of the insulating layers 2 of the composite plates 1 placed on the floor.

As shown in FIGS. 9 and 10, the air inlets and outlets of the floor may be constituted by parts 31 each comprising a vertical duct 32 projecting above the floor and communicating with horizontal air diffusion channels 33 that extend into the air passages 5 of the composite plates 1.

As shown diagrammatically in FIG. 11, a building may be fitted with a ventilation system which, for each floor, includes an air inlet 16 connected to the outside of the building, and communicating with the air passages of composite plates 1 disposed vertically on the outside of the building, as shown in FIG. 6, for example, on a facade of the building that is exposed to the sun, the air passages 5a of the vertical composite plates also communicating with the air passages 5b of horizontal plates disposed on the ceiling slab of the story concerned, the air passages 5b of the composite plates disposed on the ceiling slab themselves communicating with air passages 5c of composite plates 1 disposed on the floor slab of the story concerned, which passages 5c communicate with an air outlet 13 leading into the rooms of the building. As shown in FIG. 11, the air renewal system advantageously includes an auxiliary air inlet 14 which communicates directly with the outside atmosphere and which is preferably disposed on a facade of the building that is not exposed to the sun. The air renewal system also includes a two-position valve 34, having a first position in which the auxiliary air inlet 14 communicates directly with the passages 5c of the composite plate 1 disposed on the floor of the building, and in which the air passages 5c of the composite plate on the floor of the building are insulated from the air passages 5b of the composite plates disposed on the ceiling slab, and a second position in which the air passages of the floor of the building communicate with the air passages 5b of the ceiling, but not with the auxiliary air inlet 14. The first position is used in summer while the second position is used in winter. Air flow within the building is generally driven by means of a mechanically controlled ventilation 20 which extracts air from some of the rooms of the building. Optionally, the mechanically-controlled ventilation may be replaced and/or assisted by a blower 35 disposed in the air inlet circuit.

A blower 35' may optionally be connected to an auxiliary air inlet 14' to send new air directly into the air passages 5c of the floor, as shown in dashed lines in FIG. 11. Under such circumstances, the valve 34, the blower 35, and the air inlet 14 may be omitted. The blower 35' makes it possible to adjust at will the flow rate of air penetrating into the building, and optionally to blow air in the opposite direction along the air passages 5b of the ceiling and the facade air passages 5a, in order to cool it.

The blowers 35 or 35' may be associated with air processing means (odorization, disinfection, removing insects, etc.).

As shown in FIG. 12, the system may also include a heat pump 21 which recovers heat from the air extracted by controlled mechanical ventilation 20. Advantageously, the heat pump 21 serves to heat water in a hot water tank 22 while simultaneously cooling the air that is expelled from the building by the mechanically controlled ventilation. Advantageously, the air penetrating into the building is caused to flow through the heat pump 21, and the heat pump is adapted selectively either to cool the incoming air (in summer) or else to heat it (in winter) or else to have no temperature effect on the incoming air (between seasons).

We claim:

1. A wall element for use in a building, said wall element comprising a composite plate, comprising:
   a) at least one layer of thermally insulating material provided with a plurality of spacers individually distanced from each other and outstanding from at least one face thereof, and
   b) at least one layer of strong and hydrophilic material disposed against outer ends of the spacers of the layer of thermally insulating material,
   c) wherein the spacers define an air flow passage in which air can flow in at least two directions parallel to the plate to enable air to penetrate into the building said two directions being non-parallel to each other.

2. A wall element according to claim 1, in which the material that is strong and hydrophilic is plaster.

3. A wall element according to claim 1, in which the layer of strong and hydrophilic material is provided with a plurality of spaced, identical holes.

4. A wall element according to claim 3, in which the holes are blind holes open to a face of the layer of strong and hydrophilic material which faces away from the layer of thermally insulating material.

5. A wall element according to claim 1, in which the composite plate includes a layer of resilient sound insulation material.

6. A building floor comprising a substantially horizontal support wall and wall elements according to claim 1 placed on the support wall with the layer of strong and hydrophilic material facing upwards, the air passages of the various wall elements intercommunicating horizontally and being connected to an inlet for air coming from the outside and to an outlet for air going to the inside of the building, heater means being disposed on the layer of strong and hydrophilic material that faces upwards, and being covered in a layer of facing.

7. A floor according to claim 6, in which the layer of facing is a coating of concrete or a self-smoothing coating formed on top of the layer of strong and hydrophilic material, a waterproof film being disposed between the coating and the layer of strong and hydrophilic material to prevent any contact between the layer of strong and hydrophilic material and the coating, the heater means being embedded in the coating.

8. A floor according to claim 6, in which the layer of facing is a dry coating, the heater means being embedded in a bed of sand and the dry coating being laid on the bed of sand.

9. A building facade including a substantially vertical support wall, with wall elements according to claim 1 fixed to the support wall so that the layer of strong and hydrophilic material is directed towards the outside of the building, and a layer of facing to insulate the layer of strong and hydrophilic material bad weather, the air passages of the various wall elements being connected to an air inlet that communicates with the outside atmosphere and to an air outlet leading to the inside of the building.

10. A facade according to claim 9, in which said support wall is disposed so as to be exposed to the sun during at least a part of the day.

11. An air renewal system including a facade according to claim 10, an auxiliary air inlet for causing air at ambient temperature to enter, said auxiliary air inlet communicating directly with the outside atmosphere, the air renewal system also including means for selectively causing said air outlet to communicate either with the air passages of the wall elements of said facade that is exposed to the sun, or with the auxiliary air inlet.

12. A system for renewing air in a building, the system comprising at least one floor and ceiling each provided with wall elements according to claim 1, in which the ceiling wall elements include air passages which intercommunicate horizontally and which are connected to an air inlet which communicates with the outside of the building, the floor wall elements including air passages which intercommunicate horizontally and which communicate firstly with the air passages of the ceiling wall elements, and secondly with an air outlet leading to the inside to the building.

13. An air renewal system according to claim 12, including a facade having a vertical support wall in which air passages communicate with the air passages of the ceiling wall elements, an auxiliary air inlet for causing air at ambient temperature to enter, and further including means for selectively connecting the air passages of the floor wall elements either with the auxiliary air inlet or with the air passages of the ceiling wall elements.

14. A system for renewing the air of a building, the system comprising at least one floor or ceiling which includes wall elements according to claim 1, and further including a heat pump for extracting heat from air leaving the building, heat pump receiving the air that penetrates into the building via the air passages of the wall elements, the air renewal system further including means for selectively using the heat pump either to heat the air entering the building, or to cool the air entering the building, or else to take no action on the air entering the building.

15. An air renewal system according to claim 14, in which the heat pump is also used for heating water in a hot water tank.

16. A system for renewing the air of a building that includes at least one floor or ceiling having wall elements according to claim 1 and that further includes a blower for injecting air taken from outside the building into the air passages.

17. An air renewal system according to claim 16, in which the blower is coupled to air processing means.

18. A renewal system according to claim 16, in which the blower is connected to an auxiliary air inlet to inject air at ambient temperature.

* * * * *